(12) United States Patent
Frigge et al.

(10) Patent No.: US 11,993,738 B2
(45) Date of Patent: May 28, 2024

(54) ADHESIVE TAPE CROSS-TEARABLE BY HAND, WITH A CARRIER COMPRISING A WOVEN FABRIC AND A STITCHBONDED NONWOVEN

(71) Applicant: Coroplast Fritz Müller GmbH & Co. KG, Wuppertal (DE)

(72) Inventors: Christoph Frigge, Sprockhövel (DE); Stephan Wuth, Friedrichroda (DE); Guido Vorwerk, Warendorf (DE)

(73) Assignee: Coroplast Fritz Müller Gmbh & Co. KG, Wuppertal (DE)

( * ) Notice: Subject to any disclaimer, the term of this patent is extended or adjusted under 35 U.S.C. 154(b) by 742 days.

(21) Appl. No.: 17/057,894

(22) PCT Filed: Apr. 18, 2019

(86) PCT No.: PCT/EP2019/060183
§ 371 (c)(1),
(2) Date: Nov. 23, 2020

(87) PCT Pub. No.: WO2019/223943
PCT Pub. Date: Nov. 28, 2019

(65) Prior Publication Data
US 2021/0261827 A1    Aug. 26, 2021

(30) Foreign Application Priority Data
May 24, 2018    (DE) .............. 10 2018 112 504.6

(51) Int. Cl.
*C09J 7/21* (2018.01)
*C09J 7/25* (2018.01)
(Continued)

(52) U.S. Cl.
CPC . *C09J 7/29* (2018.01); *C09J 7/21* (2018.01); *C09J 7/255* (2018.01); *C09J 7/383* (2018.01);
(Continued)

(58) Field of Classification Search
None
See application file for complete search history.

(56) References Cited

U.S. PATENT DOCUMENTS

2015/0298422 A1* 10/2015 Lodde .................. B32B 7/00
156/193
2016/0176154 A1* 6/2016 Wittig .................. B32B 27/26
428/86

FOREIGN PATENT DOCUMENTS

CN    110511689 A    11/2019
DE    202005013009 U1    10/2005
(Continued)

OTHER PUBLICATIONS

Fritz, Muller et al., Machine translation of DE202006016438 U1, Feb. 14, 2008 (Year: 2008).*
(Continued)

*Primary Examiner* — Anish P Desai
(74) *Attorney, Agent, or Firm* — Dickinson Wright PLLC

(57) ABSTRACT

An adhesive tape for winding around cables includes a carrier (T) with a first layer (1) made of woven fabric and with a second layer (2) made of a sewn bonded fiber fleece, wherein both layers rest fully upon each other. Between the first layer (1) and second layer (2) there is a first adhesive layer (3), wherein the second layer (2) features at least in part a second adhesive layer (4) which is arranged on the opposite side to the first adhesive layer (3). The first layer (1) features a surface weight of 100 to 200 g/m², wherein the material of the first adhesive layer (3) comprises an adhesive and the material of the second adhesive layer (4) comprises an adhesive. The second layer (2) features a surface weight of 60 to 160 g/m².

17 Claims, 1 Drawing Sheet

(51) Int. Cl.
*C09J 7/29* (2018.01)
*C09J 7/38* (2018.01)

(52) U.S. Cl.
CPC ......... *C09J 7/385* (2018.01); *C09J 2203/302* (2013.01); *C09J 2301/124* (2020.08); *C09J 2301/162* (2020.08); *C09J 2301/302* (2020.08); *C09J 2400/263* (2013.01); *C09J 2407/00* (2013.01); *C09J 2409/00* (2013.01); *C09J 2433/00* (2013.01); *C09J 2467/006* (2013.01); *Y10T 428/2848* (2015.01); *Y10T 428/2891* (2015.01)

(56) References Cited

FOREIGN PATENT DOCUMENTS

| | | |
|---|---|---|
| DE | 102014119526 A1 | 6/2016 |
| DE | 202018101383 U1 | 4/2018 |
| EP | 1911824 A1 | 4/2008 |
| EP | 2322385 A1 | 5/2011 |
| EP | 2671760 A1 | 12/2013 |
| WO | 9950943 A1 | 10/1999 |
| WO | 2009086570 A1 | 7/2009 |

OTHER PUBLICATIONS

English translation of EP1911824 A1 (Year: 2008).*
European Patent Office, Rijswijk, Netherlands, International Search Report of International Application No. PCT/EP2019/060183, dated Jul. 30, 2019, 2 pages.

* cited by examiner

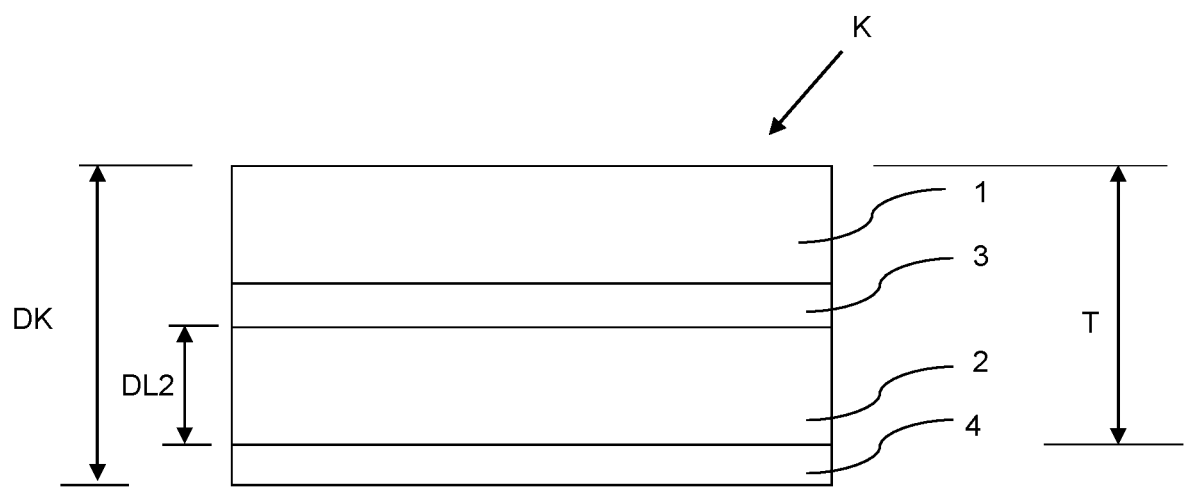

ADHESIVE TAPE CROSS-TEARABLE BY HAND, WITH A CARRIER COMPRISING A WOVEN FABRIC AND A STITCHBONDED NONWOVEN

CROSS REFERENCE TO RELATED APPLICATIONS

This application is a 35 U.S.C. § 371 national phase application of International Application No.: PCT/EP2019/060183, filed Apr. 18, 2019, which claims the benefit of priority under 35 U.S.C. § 119 to German Patent Application No.: 10 2018 112 504.6, filed May 24, 2018, the contents of which are incorporated herein by reference in their entirety.

FIELD

The invention relates to an adhesive tape, as a cable winding tape for the automobile industry.

BACKGROUND

The statements in this section merely provide background information related to the present disclosure and several definitions for terms used in the present disclosure and may not constitute prior art.

The testing of adhesive tapes for winding of cable sets usually occurs in the automobile industry according to extensive Standards, such as e.g. in LV 312 "Adhesive Tapes for Cable Sets in Motor Vehicles" (December 2014) as a common testing guideline used by Audi, BMW, DC and VW.

With regard to abrasion resistance, LV 312 (December 2014) provides classifications as defined in table 1 below.

TABLE 1

Organization of Abrasion Classes according to LV 312 (December 2014)

| Abrasion class | Requirement (number of strokes) |
| --- | --- |
| A—no abrasion protection | <100 |
| B—little abrasion protection | 100/499 |
| C—moderate abrasion protection | 500/999 |
| D—high abrasion protection | 1000/4999 |
| E—very high abrasion protection | Greater than 5000 |

With regard to noise damping behavior, LV 312 (December 2014) provides for an organization into five classes which is presented in table 2 below.

TABLE 2

Organization of noise-damping properties into classes according to LV 312 (December 2014)

| Noise damping class | Requirement |
| --- | --- |
| A—no noise damping | 0 to <2 dB (A) |
| B—little noise damping | >2 to 5 dB (A) |
| C—moderate noise damping | >5 to 10 dB (A) |
| D—high noise damping | >10 to 15 dB (A) |
| E—very high noise damping | >15 dB (A) |

Hand-tearability is characterized in LV312 (December 2014) by the determination of the rupture force according to DIN EN 14410 of the material, and also by a manual tearing of the tape transverse to the running direction and a subjective assessment of the tear edge and also of the required force application. In order that the hand tearability of the adhesive tape can be specified, the rupture force of the adhesive tape must be less than 90 N/cm. For classification of the adhesive tape as easily hand tearable or conditionally hand tearable, a subjective assessment by 3 trained persons is required, who tear the adhesive tape several times.

This guideline also defines and describes additional test methods which are important in practical applications with regard to thermal resistance, compatibility of adhesive tapes with electrical vehicle lines and also for the chemical resistance, color resistance and fogging behavior.

Document EP 1 911 824 B2 discloses a two-layer adhesive tape which consists of a woven fabric and a sewn bonded fiber fleece. The adhesive tape disclosed therein does indeed correspond to the expectations regarding abrasion resistance and noise damping, however, it does exhibit the disadvantage that it is not hand-tearable in the cross direction. Thus the assembler must cut the adhesive tape with a tool, which is time-consuming.

The object of the present disclosure is to overcome the disadvantage of the adhesive tape as described above. In particular, an adhesive tape is to be developed for manufacture of a cable tree which features, in addition to high abrasion resistance and high noise damping, a good cross-direction hand-tearability. In addition, the adhesive tape shall satisfy the requirements of test guideline LV 312 (December 2014) of the automobile industry.

SUMMARY

The object of the present disclosure is attained by an adhesive tape of the kind used for winding around cables. This adhesive tape comprises a carrier (T) with a first layer (1) made of woven fabric and with a second layer (2) made of a sewn bonded fiber fleece, wherein both layers rest fully upon each other, wherein between the first layer (1) and second layer (2) there is a first adhesive layer (3), wherein the second layer (2) features at least in part a second adhesive layer (4), which is arranged on the opposite side to the first adhesive layer (3), wherein the first layer (1) features a surface weight of 100 to 200 g/m$^2$, wherein the material of the first adhesive layer (3) comprises a pressure sensitive adhesive, the material of the second adhesive layer (4) comprises an pressure sensitive adhesive. The second layer (2) features a surface weight of 60 to 160 g/m$^2$, wherein the adhesive tape can be torn in the cross direction by hand.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 1 shows a schematic cross-section through an adhesive tape with an adhesive on one side.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The present disclosure provides an adhesive tape or winding around cables. This adhesive tape comprises a carrier (T) with a first layer (1) made of woven fabric and with a second layer (2) made of a sewn bonded fiber fleece, wherein both layers rest fully upon each other, wherein between the first layer (1) and second layer (2) there is a first adhesive layer (3), wherein the second layer (2) features at least in part a second adhesive layer (4), which is arranged on the opposite side to the first adhesive layer (3), wherein the first layer (1) features a surface weight of 100 to 200 $g/m^2$, wherein the material of the first adhesive layer (3) comprises a pressure sensitive adhesive, the material of the second adhesive layer (4) comprises a pressure sensitive adhesive. The second layer (2) features a surface weight of 60 to 160 $g/m^2$, wherein the adhesive tape can be torn in the cross direction by hand.

Surprisingly, the adhesive tape according to the present disclosure features a class E abrasion resistance, a class C noise damping and can be torn by hand in the cross direction.

As material for the fabric, preferably a polyester can be used, in particular polyethylene terephthalate (PET), polyamides (PA), in particular PA 6, PA 6.6, PA 12 or a combination of these materials.

Preferably the woven fabric can feature a number of warp threads in the range of 35 to 50 per 1 cm, preferably 43 up to 47 per 1 cm, with a fineness of the warp threads (warp thread weight) in the range of 35 to 55 dtex, preferably 43 to 47 dtex, and a number of weft threads in the range of 14 to 25 per 1 cm, preferably 19 to 23 per 1 cm, with a fineness of the weft threads (weft thread weight) in the range of 500 up to 700 dtex, preferably 580 to 630 dtex. The fabric features a surface weight of 100 to 200 $g/m^2$, preferably 150 to 180 $g/m^2$. The advantage of this fabric is that it contributes significantly to the high abrasion resistance, here: class E according to LV 312 (December 2014). In spite of this abrasion resistance, the adhesive tape can still be torn by hand. This is also a result of the ratio of fineness of the warp threads to the fineness of the weft threads of 0.05 to 0.1.

In addition, the adhesive tape according to the present disclosure also comprises a second layer made of a bonded fiber fleece. The bonded fiber fleece consists of non-ordered fibers and is also known as "non-woven." These non-woven fabrics are designed as sewn non-woven fabrics for stabilizing of the fibers. A sewn (also called: stitched) non-woven fabric can feature preferably a number of threads in the range of 14 to 24 per 25 mm, preferably 19 to 23 per 25 mm, with a fineness of the sewing threads (weight of sewing thread) in the range of 40 to 55 dtex, preferably 47 to 53 dtex. The fineness of the sewing threads is preferably less than 65 dtex so as not to adversely affect hand tearability. A stitched non-woven fabric of this kind has a surface weight in the range of 60 to 160 $g/m^2$, preferably in the range of 70 to 140 $g/m^2$, more preferably in the range of 80 to 130 $g/m^2$.

The non-woven fabric used according to the present disclosure acts fundamentally as noise-damping. Surprisingly, with the use of a combination of a woven fabric and a non-woven fabric with low surface weight according to the present disclosure, a high degree of noise damping can nonetheless be attained. The adhesive tapes satisfy noise damping class C according to LV 312 (December 2014).

The first layer of the carrier is bonded to the second layer of the carrier by means of a first adhesive layer. The adhesive layer is applied onto the entire surface area of the one layer. The second layer of the carrier is likewise bonded onto the entire surface area of the first layer of the carrier. As material for the first adhesive layer, a pressure sensitive adhesive material is used, such as an adhesive based on a natural rubber or a synthetic rubber. Preferably a pressure sensitive adhesive material is used which is based on a UV-crosslinking acrylate. The first adhesive layer on the fabric features a surface weight in the range of 60 to 130 $g/m^2$.

A second adhesive layer is applied at least partially, and preferably onto the entire surface area of the second layer disposed oppositely to the first layer. The material of this second adhesive layer is a pressure sensitive adhesive material, such as an adhesive based on a natural rubber or a synthetic rubber. Preferably a pressure sensitive adhesive material is used which is based on a UV-crosslinking acrylate. The second adhesive layer features in particular a surface weight in the range of 60 to 120 $g/m^2$. The first adhesive layer likewise increases the abrasion resistance. Thus the first adhesive layer features preferably a greater surface weight than the second adhesive layer.

The total thickness of the adhesive tape is obtained from the carrier and the second adhesive layer, wherein the carrier comprises the first layer, the first adhesive layer and the second layer. The total thickness is measured according to DIN EN 1942 under a load of 50 kPa and according to DIN EN 2286 with a load of 2 kPa. The total thickness according to DIN EN 1942 is in a range of 0.40 to 1.0 mm, preferably 0.5 to 0.9 mm. The total thickness according to DIN EN 2286 is in a range of 0.55 to 1.3 mm, preferably 0.6 to 1.1 mm.

The different pressure loading used in determining the total thickness means that the carrier is under different compression force and a portion of the air mass located in the carrier will escape. Generally the compressibility is correlated to the noise damping class.

Due to the sewn non-woven fabric as second layer in the carrier, an increased thickness of the adhesive tape and an increased strength are obtained. Nonetheless, the property of hand tearability in the cross direction is retained, which is surprising due to the combination of the two layers with the adhesive layers. Thus an adhesive tape is obtained with abrasion class E and with an average noise damping class C, which can yet be easily torn by hand in the cross direction.

The adhesive tape additionally has good adhesion strength on steel and to the tape back (see table 3), and features an elongation at break in the range of 50 to 70% and a rupture strength in the range of 70 to 100 N/cm.

The adhesive tape according to the present disclosure is used as a cable winding tape in the manufacture of a cable tree.

Referring now to the FIGURES, the following description is not limited to the design examples and not to all or a plurality of features or described feature combinations, rather each individual part feature of the design example is also of importance to the subject matter of the present disclosure, even detached from all other part features described in connection therewith, and also in combination with any other particular features of another design example.

FIG. 1 depicts one embodiment of an adhesive tape with adhesive on one side, according to the present disclosure.

The structure of the adhesive tape K according to example 1 of table 3 comprises a woven fabric made of polyethylene terephthalate (PET) with a surface weight of 160 g/m², with a number of warp threads of 45 per 1 cm, a fineness of the warp threads of 45 dtex, a number of weft threads of 23 per 1 cm and a fineness of the weft threads of 600 dtex.

This fabric represents a first layer 1 of the carrier T, and a first adhesive layer 3 consisting of UV-crosslinking acrylate is applied onto the entire surface area thereof. The surface weight of the adhesive layer 3 amounts to 60-130 g/m², in particular 70-100 g/m², preferably 90 g/m².

In addition to the first layer 1 with the first adhesive layer 3, the carrier T also features a second layer 2 made of a non-woven fiber fabric with fibers and sewing threads made of polyethylene terephthalate (PET), with a surface weight of 60 to 160 g/m², in particular of 80 g/m², with a number of sewing threads of 14 to 24 in particular of 22 per 25 mm and a fineness of the sewing threads of 50 dtex. The non-woven fabric features a parallel orientation of the sewing threads to the warp threads of the fabric.

The remaining, free side of the second layer 2 of the carrier T is positioned opposite to the first adhesive layer 3. A UV-crosslinking acrylate is applied onto the entire surface area of the free side of the second layer 2 and is crosslinked with UV radiation, so that a pressure sensitive adhesive material is produced. This adhesive layer 4 can be produced with a surface weight of 50-90 g/m², preferably 65 g/m².

The adhesive tape K is wound up into a roll and the confectioning of the adhesive tape K is completed by cutting off of a portion of the roll or during the roll-up by means of a longitudinal cut. The resulting adhesive tape K has a thickness DK of 0.65 mm at a pressure load on the adhesive tape of 2 kPa according to DIN EN 2286, and a thickness DK of 0.55 mm at a pressure load of 50 kPa according to DIN EN 1942, which signifies a difference of 0.1 mm. Thus the adhesive tape is compressible and the formation of a persistent air mass in the sewn non-woven fabric increases the noise damping. In addition, with a weight of the tape of 420 g/m² it is comparatively light.

The advantage of the adhesive tape produced in this manner is that it has an abrasion class E and a noise damping class C and a very good cross-direction hand tearability.

The structure of the adhesive tape K in example 2 is the same as the structure of example 1, wherein the parameters of surface weight of the sewn non-woven fabric, adhesive weight, tape weight, tape thickness, abrasion, noise damping and hand tearability are changed in comparison to example 1, as indicated in table 3.

The adhesive tape K of example 2 has a thickness DK of 1.0 mm at a pressure load of 2 kPa on the adhesive tape according to DIN EN 2286, and a thickness DK of 0.82 at a pressure load of 50 kPa on the adhesive tape according to DIN EN 1942, which signifies a difference of 0.2 mm. Thus the adhesive tape is compressible and the formation of a persistent air mass in the sewn non-woven fabric increases the noise damping. However, the tape weight of 480 g/m² is greater than in the first example.

The adhesive tape of the second example has the advantage that it can resist a greater number of double strokes in comparison to the adhesive tape of the first example. Furthermore, the noise damping properties are increased in comparison to the first example. The cross-direction hand tearability, however, has decreased insignificantly.

TABLE 3

|  | Standard | Unit | Example 1 | Example 2 |
|---|---|---|---|---|
| PET-fabric, weight | EN 2286 | g/m² | 160 | 160 |
| Number of warp threads |  | 1/cm | 45 | 45 |
| Weight of warp threads |  | dtex | 45 | 45 |
| Number of weft threads |  | 1/cm | 23 | 23 |
| Weight of weft threads |  | dtex | 600 | 600 |
| Adhesive 1 | — |  | UV-Acrylate | UV-Acrylate |
| Adhesive weight 1 | EN 2286 | g/m² | 90 | 100 |
| PET sewn non-woven, weight | EN 2286 | g/m² | 80 | 130 |
| Weight of sewing threads |  | dtex | 50 | 50 |
| Number of sewing threads |  | 1/25 mm | 22 | 22 |
| Adhesive 2 | — |  | UV-Acrylate | UV-Acrylate |
| Adhesive weight 2 | EN 2286 | g/m² | 65 | 90 |
| Tape weight | EN 2286 | g/m² | 395 | 480 |
| Tape thickness (50 kPa) | EN 1942 | mm | 0.55 | 0.82 |
| Tape thickness (2 kPa) | EN 2286 | mm | 0.65 | 1.00 |
| Rupture strength | EN 14410 | N/cm | 75 | 85 |
| Elongation at tear | EN 14410 | % | 60 | 60 |
| Adhesive strength, steel | EN 1939 | N/cm | 6 | 6 |
| Adhesive strength, tape back | EN 1939 | N/cm | 8 | 8 |
| Abrasion | LV312 | Number of double strokes | 6000, class E | 8000, class E |
| Noise damping | LV312 | dB(A) | 6-7, class C | 8-9, class C |
| Hand tearability | LV312 | — | good | good |

The invention is not limited to the illustrated and described embodiments, but rather encompasses also all designs which are equivalent within the sense of the invention. It is expressly emphasized that the exemplary embodiments are not limited to all features in combination, rather, each individual part feature can by itself also have inventive significance even detached from all other part features. Furthermore, the invention is also not limited to the combination of features defined in claim 1, but rather can also be defined by any other particular combination of particular features of all the disclosed individual features. This means that basically virtually each individual feature of claim 1 can be omitted and/or replaced by at least one individual feature disclosed elsewhere in the application.

LIST OF REFERENCE SYMBOLS

1=first woven layer of the carrier
2=second sewn non-woven layer of the carrier
3=first adhesive layer between the first and second layers
4=second adhesive layer
DL2=thickness of sewn non-woven fabric
DK=thickness of adhesive tape with adhesive on one side
K=adhesive tape
T=carrier

The invention claimed is:

1. An adhesive tape for winding around cables, comprising a carrier (T) with a first layer made of woven fabric and with a second layer made of a sewn bonded fiber fleece, wherein both layers rest fully upon each other, wherein between the first layer and second layer there is a first adhesive layer, wherein the second layer features at least in part a second adhesive layer which is arranged on the opposite side to the first adhesive layer, wherein the first layer features a surface weight of 100 to 200 g/m², wherein the material of the first adhesive layer comprises a pressure sensitive adhesive, the material of the second adhesive layer comprises a pressure sensitive adhesive, wherein the second layer features a surface weight of 60 to 160 g/m², wherein the adhesive tape can be torn in the cross direction by hand.

2. The adhesive tape according to claim 1, wherein the second layer has a surface weight of 70 to 140 g/m².

3. The adhesive tape according to claim 1, wherein the adhesive tape has an overall thickness (DK) measured according to DIN EN 1942 that is in a range from 0.40 to 1.0 mm.

4. The adhesive tape according to claim 1, wherein the first adhesive layer features a weight that is in a range from 60 to 130 g/m².

5. The adhesive tape according to claim 1, wherein the woven fabric comprises warp threads and the sewn bonded fiber fleece of the second layer comprises sewing threads, wherein the sewing threads have a fineness that is in a range from 40 to 55 dtex, wherein the number of sewing threads is in the range from 14 to 24 per 25 mm with the sewing threads having a parallel orientation to the warp threads of the woven fabric.

6. The adhesive tape according to claim 1, wherein the woven fabric of the first layer of the carrier (T) comprises a polyester and/or a polyamide.

7. The adhesive tape according to claim 1, wherein the sewn bonded fiber fleece of the second layer of the carrier (T) comprises a polyester.

8. The adhesive tape according to claim 1, wherein the woven fabric of the first layer of the carrier (T) comprises warp threads and weft threads, the warp threads having a fineness in the range of 35 to 55 dtex and the weft threads having a fineness in the range of 500 to 700 dtex.

9. The adhesive tape according to claim 1, wherein the adhesive of the first adhesive layer and/or of the second adhesive layer comprises a UV-crosslinked acrylate or an adhesive based either on a natural rubber or on a synthetic rubber.

10. The adhesive tape according to claim 1, wherein the adhesive tape exhibits at least a class E abrasion value measured according to LV 312 and a noise damping behavior of at least class C measured according to LV 312.

11. The adhesive tape according to claim 3, wherein the overall thickness (DK) of the adhesive tape is in the range from 0.5 to 0.9 mm.

12. The adhesive tape according to claim 4, wherein the weight of the first adhesive layer is in the range from 70 to 100 g/m².

13. The adhesive tape according to claim 6, wherein the fabric of the first layer of the carrier (T) comprises polyethylene terephthalate (PET).

14. The adhesive tape according to claim 7, wherein the sewn bonded fiber fleece of the second layer of the carrier (T) comprises polyethylene terephthalate (PET).

15. The adhesive tape according to claim 5, wherein the sewing threads in the sewn bonded fiber fleece of the second layer comprise a polyester.

16. The adhesive tape according to claim 15, wherein the sewing threads in the sewn bonded fiber fleece of the second layer comprise polyethylene terephthalate (PET).

17. The adhesive tape according to claim 2, wherein the second layer has a surface weight of 80 to 130 g/m².

* * * * *